United States Patent
Seo et al.

(10) Patent No.: US 11,875,048 B2
(45) Date of Patent: Jan. 16, 2024

(54) MEMORY MANAGEMENT SYSTEM AND METHOD BASED ON NON-UNIFORM MEMORY ACCESS

(71) Applicant: Research & Business Foundation Sungkyunkwan University, Suwon-si (KR)

(72) Inventors: Eui Seong Seo, Suwon-si (KR); Hyun Woo Ahn, Suwon-si (KR); Jong Seok Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/848,503

(22) Filed: Jun. 24, 2022

(65) Prior Publication Data
US 2022/0413724 A1    Dec. 29, 2022

(30) Foreign Application Priority Data

Jun. 25, 2021   (KR) .......................... 10-2021-0082896

(51) Int. Cl.
*G06F 3/06* (2006.01)

(52) U.S. Cl.
CPC .......... *G06F 3/0634* (2013.01); *G06F 3/0611* (2013.01); *G06F 3/0631* (2013.01); *G06F 3/0683* (2013.01)

(58) Field of Classification Search
CPC .... G06F 3/0634; G06F 3/0611; G06F 3/0631; G06F 3/0683; G06F 16/1815; G06F 16/176; G06F 16/188; G06F 13/1657; G06F 13/1663; G06F 12/0813; G06F 2212/2542

See application file for complete search history.

(56) References Cited

U.S. PATENT DOCUMENTS

| | | | |
|---|---|---|---|
| 9,021,297 B1* | 4/2015 | Hayes ................. | G06F 11/2056 |
| | | | 719/330 |
| 9,152,578 B1* | 10/2015 | Saad .................... | H04L 63/0428 |
| 2020/0409584 A1* | 12/2020 | Matsumoto ............. | G06F 3/061 |
| 2021/0342301 A1* | 11/2021 | Kamalaksha ......... | G06F 16/178 |

OTHER PUBLICATIONS

Charles P. Wright, "Kernel Korner—Unionfs: Bringing Filesystems Together", Linux Journal, Dec. 1, 2004 (Year: 2004).*
Z. Yang, A. Zhang and Z. Mo, "PsmArena: Partitioned shared memory for NUMA-awareness in multithreaded scientific applications," in Tsinghua Science and Technology, vol. 26, No. 3, pp. 287-295, Jun. 2021, doi: 10.26599/TST.2019.9010036. (Year: 2020).*

* cited by examiner

*Primary Examiner* — Khoa D Doan
(74) *Attorney, Agent, or Firm* — NSIP Law

(57) ABSTRACT

Provided is a memory management system based on a non-uniform memory access, which includes: a first persistent memory disposed in a first node; a second persistent memory disposed in a second node physically distinguished from the first node; a first journaling process disposed in the first persistent memory; and a second journaling process disposed in the second persistent memory.

5 Claims, 4 Drawing Sheets

[FIG. 1]
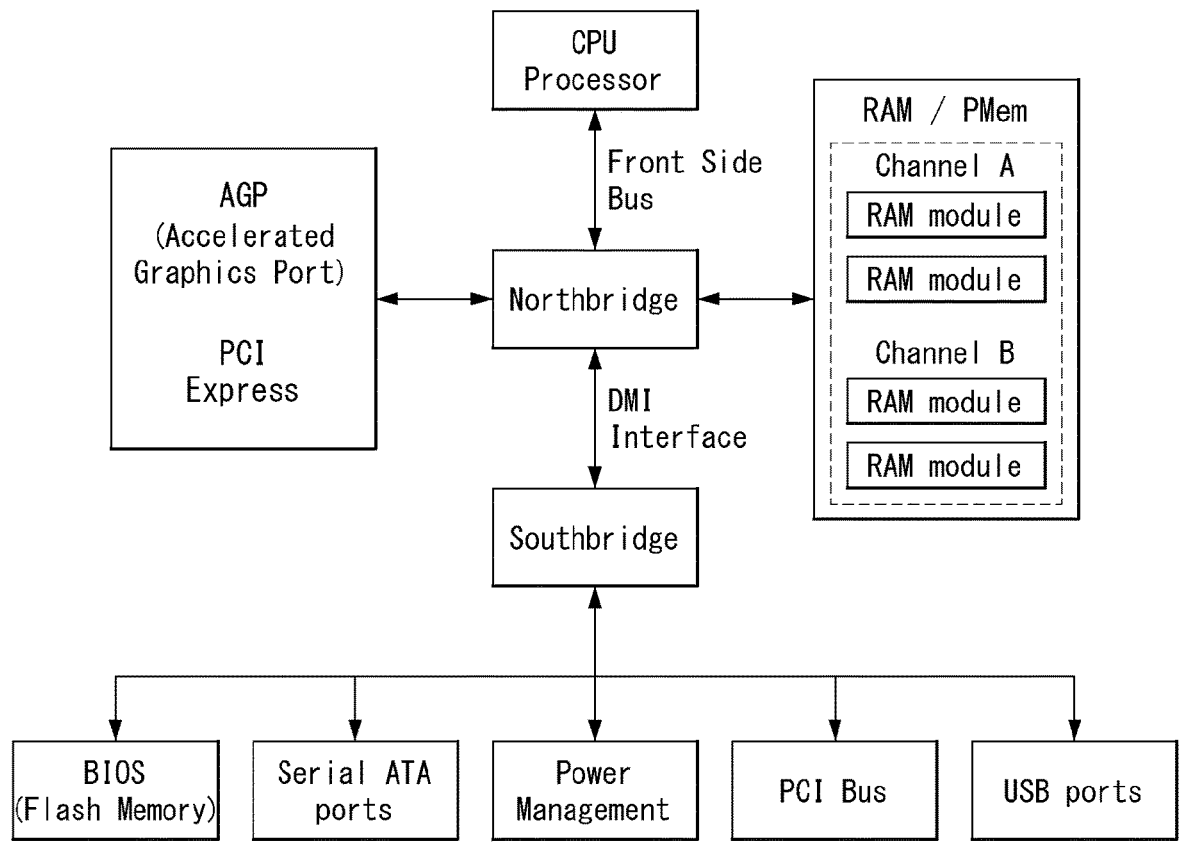

[FIG. 2]
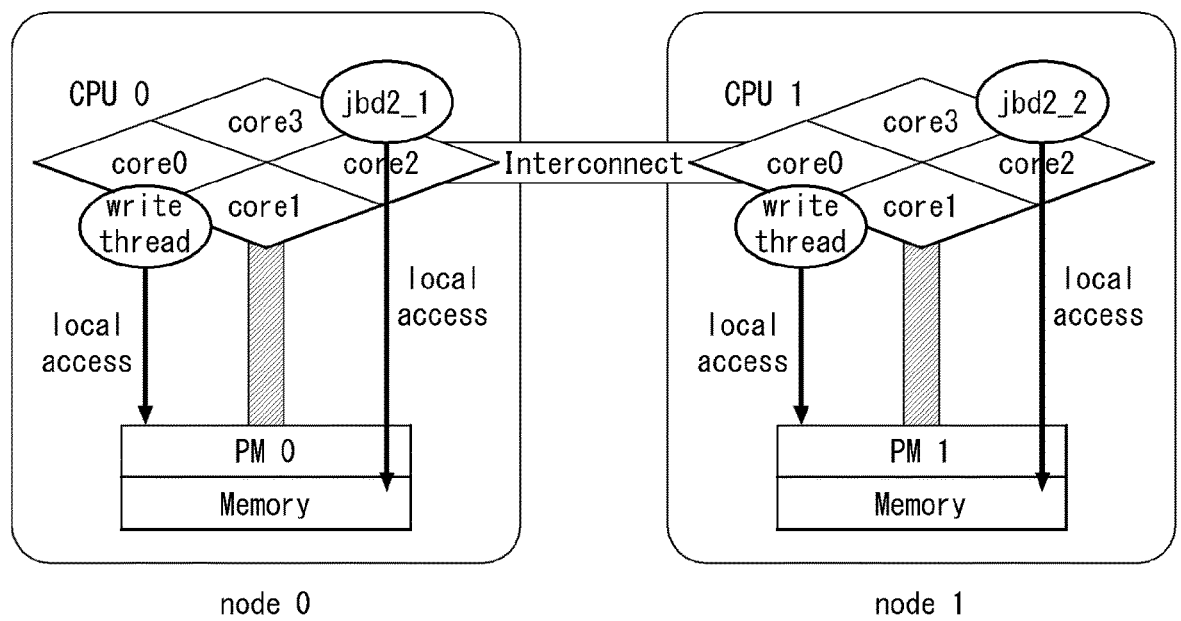

[FIG. 3]
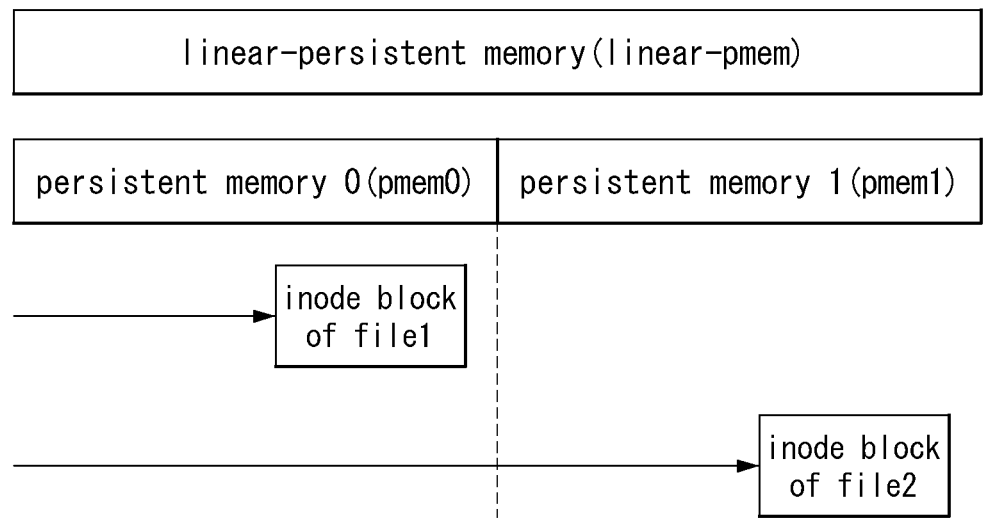

[FIG. 4]
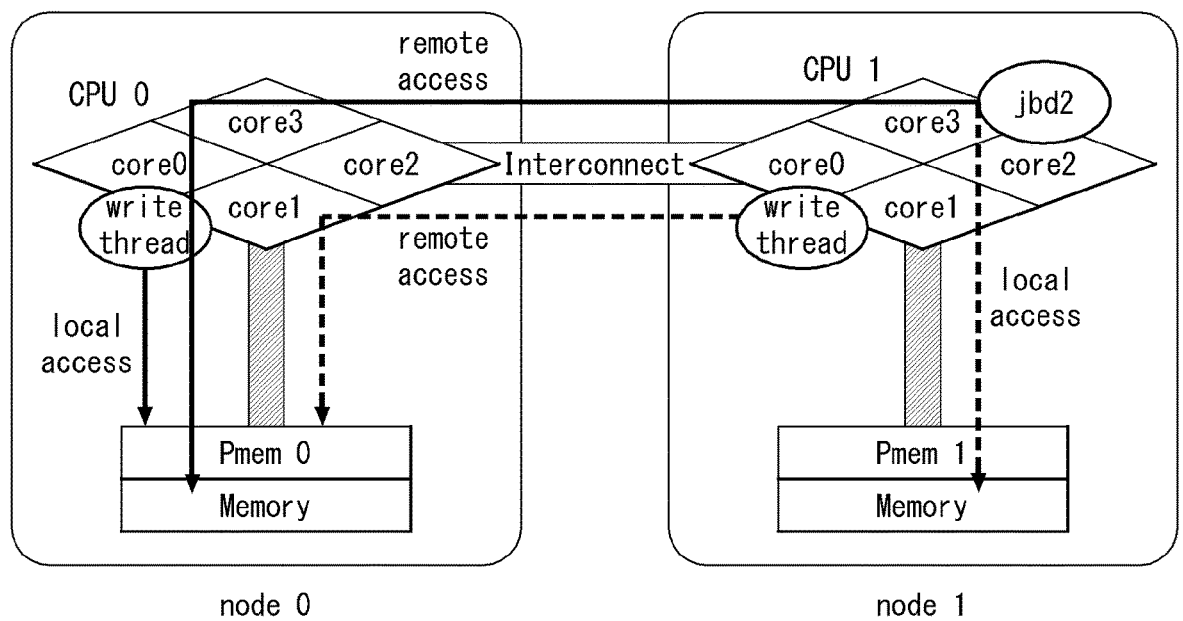

MEMORY MANAGEMENT SYSTEM AND METHOD BASED ON NON-UNIFORM MEMORY ACCESS

CROSS-REFERENCE TO RELATED APPLICATIONS

This application claims priority under 35 U.S.C. § 119 to Korean Patent Application No. 10-2021-0082896 filed on Jun. 25, 2021, in the Korean Intellectual Property Office, the disclosures of which are incorporated by reference herein in their entireties.

BACKGROUND OF THE DISCLOSURE

Field of the Disclosure

The present disclosure relates to a memory management system and a memory management method based on a non-uniform memory access, which are capable of enhancing a write speed.

Related Art

In a file system, a technique called journaling is used in order to maintain data consistency by solving a crash consistency problem of a file. As compared with a case where physical distances of a hard disk drive and a solid state drive in the past from a central processing unit (CPU) in connection with Southbridge are equal to each other, a dual inline memory module (DIMM) slot is used, which is connected to the central processing unit through Northbridge, so there is a physical distance difference from the central processing unit. In particular, in a process of performing the journaling in a non-uniform memory access (NUMA) structure, when a journaling process is located in a remote node, even though a write thread performs a local access, the remote access occurs in the journaling, and as a result, there is a problem in that overall performance decreases.

SUMMARY OF THE DISCLOSURE

The present disclosure provides a memory management system based on an NUMA for improving a phenomenon in which a speed of a write thread is lowered according to a position of a journaling process.

In an aspect, provided is a memory management system based on a non-uniform memory access, which includes: a first persistent memory disposed in a first node; a second persistent memory disposed in a second node physically distinguished from the first node; a first journaling process disposed in the first persistent memory; and a second journaling process disposed in the second persistent memory.

According to the present disclosure, in a NUMA system, a remote access can be prevented regardless of a write thread, and as a result, speed lowering due to the remote access can be improved.

BRIEF DESCRIPTION OF THE DRAWINGS

FIG. 1 is a diagram illustrating a configuration of a main board including an embodiment of the present disclosure.

FIG. 2 is a schematic view illustrating a configuration of a memory management system according to an embodiment of the present disclosure.

FIG. 3 is a schematic view for describing an implementation example of a linear persistent memory.

FIG. 4 is a diagram illustrating an architecture of a memory management system in the related art.

DESCRIPTION OF EXEMPLARY EMBODIMENTS

This work was partly supported by Next-Generation Information Computing Development Program through the National Research Foundation of Korea (NRF) grant funded by the Ministry of Science, ICT (NRF-2016M3C4A7952587, PF Class Heterogeneous High Performance Computer Development) and Institute of Information & Communications Technology Planning & Evaluation (IITP) grant funded by the Korea government (MSIT) (2021-0-00773, Research on Edge-Native Operating Systems for Edge Micro-Data-Centers).

Advantages and features of the present disclosure, and methods for accomplishing the same will be more clearly understood from exemplary embodiments described in detail below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the disclosure, and the present disclosure will be defined only by the appended claims.

The features of various embodiments of the present disclosure can be partially or entirely coupled to or combined with each other and can be interlocked and operated in technically various ways, and the embodiments can be carried out independently of or in association with each other.

Terms including ordinal numbers, such as first, second, etc., used in the present disclosure can be used to describe various components, but the components should not be limited by the terms. The terms are used only to discriminate one element from another element. For example, a first component may be named as a second component and similarly, the second component may also be named as the first component without departing from the scope of the present disclosure.

Hereinafter, embodiments disclosed in the present disclosure will be described in detail with reference to the accompanying drawings and the same or similar components are denoted by the same reference numerals regardless of a sign of the drawing, and duplicated description thereof will be omitted.

Further, in describing the technology disclosed in the present disclosure, a detailed description of related known technologies will be omitted if it is determined that the detailed description makes the gist of the technology of the present disclosure unclear. Further, it is noted that the accompanying drawings are used just for easily appreciating the spirit of the technology of the present disclosure, and it should not be analyzed that the spirit of the technology is limited by the accompanying drawings.

FIG. 1 is a diagram illustrating a configuration of a main board including an embodiment of the present disclosure.

Referring to FIG. 1, the main board including an embodiment of the present disclosure includes a central processing unit (CPU), an accelerated graphics port (AGP), a peripheral component interconnect bus (PCI Express), a random access memory (RAM), a persistent memory (PMem, PM), a basic input/output system (BIOS), serial ATA ports, a power management, a PCI bus, universal serial bus ports, Northbridge, Southbridge, and the like.

The Northbridge is located close to the CPU, and controls the CPU and the RAM. The Northbridge also controls a high-speed extension card slot such as the AGP, the PCI express, etc. That is, when a graphic card is connected to the AGP or the PCI express lot, the graphic card is controlled through the Northbridge.

The Southbridge is generally installed at a position further from the CPU than the Northbridge. Unlike controlling a device related to an operation by the Northbridge, the Southbridge controls an input/output device. The Southbridge takes charge of controlling an IDE/SATA port to which a hard disk or an optical disk drive (ODD) is connected, a USB port to which a keyboard or a mouse is connected, a PCI slot into which a low-speed extension device such as a LAN card or a sound card, etc.

FIG. 2 is a schematic view illustrating a configuration of a memory management system according to an embodiment of the present disclosure. FIG. 3 is a schematic view for describing an implementation example of a linear persistent memory. The memory management system according to an embodiment of the present disclosure is based on a memory design of a non-uniform memory access (NUMA).

Referring to FIGS. 2 and 3, the memory management system according to an embodiment of the present disclosure includes a first persistent memory PM0, a second persistent memory PM1, a first journaling process jbd2_1, and a second journaling process jbd2_2.

The journaling which is used for solving crash consistency of a file system refers to storing a data change history in a memory before writing data to the memory. A beginning and an end of a journal are distinguished as a transaction begin (TxB) and a transaction end (TxE), and the journal is managed as a unit of a transaction. The transaction as a set of operations required for performing one task refers to a unit of a logic task.

"jbd2" refers to a journaling process of Linux, and in the present disclosure, journaling processes that take charge of respective nodes are referred to as a first journaling process jbd2_1 and a second journaling process jbd2_2, respectively.

The first persistent memory PM0 and the second persistent memory PM1 are virtually integrated and implemented as a linear-persistent memory. That is, the first persistent memory PM0 and the second persistent memory PM1 are physically distinguished, but may be logically recognized as one device by a user. In addition, the first persistent memory PM0 and the second persistent memory PM1 share one file system.

The first journaling process jbd2_1 and the second journaling process jbd2_2 determine nodes to be subjected to journaling according to a position of metadata of a target file receiving a write request. For example, when the metadata of the target file is present in a first node node0, the first journaling process jbd2_1 performs the journaling. In addition, when the metadata of the target file is present in a second node node1, the second journaling process jbd2_2 performs the journaling.

In this case, the node refers to the CPU and a local memory. The first node node0 refers to a node into which the first persistent memory PM0 is inserted, and the second node node1 refers to a node into which the second persistent memory PM1 is inserted.

According to an embodiment of the present disclosure, as illustrated in FIG. 2, since the first and second journaling processes jbd2_1, jbd2_2 take charge of respective nodes in a one to one manner, the remote access is prevented. Further, since the file is written to the same node as the metadata, the remote access may be prevented from occurring. In this case, the remote access refers to a path through which the CPU accesses the memory of another node, and a local access refers to a path through which the CPU accesses the local memory.

Contrary to this, an architecture of the memory management system in the related art is described below.

FIG. 4 is a diagram illustrating an architecture of a memory management system in the related art.

Referring to FIG. 4, in the memory management system in the related art, one journaling process jbd2 is involved in a write operation of the first node node0 and the second node node1. Accordingly, as illustrated in FIG. 4, when the journaling process jbd2 is located in the second node node1 corresponding to a remote node while the write operation is performed to the first node node0, even though a write thread performs a local access, the remote access occurs in the journaling process, so performance is lowered.

Contrary to this, in an embodiment of the present disclosure, since the remote access in the journaling process is prevented regardless of a state of the write thread, the speed of the write operation may be enhanced.

A result of experimenting a performance enhancement degree of the write operation based on an embodiment of the present disclosure is as follows.

An experiment condition is set so that persistent memories mounted on each node in a DAX mode may be bound into the linear-persistent memory and used like one device by formatting ext4 which is the file system most widely in a Linux operating system in the persistent memory and mounting ext4 in the DAX mode. Thereafter, after writing is performed to the device as large as 4 KB which is a size of one block, the experiment is configured by a format in which a total of 5 gigabytes are written to the local node by repeating a process of performing the journaling through fsync. When the journaling process is located in the remote node based on the write thread in the case of the existing file system in the corresponding experiment, it may be identified that an experiment result value of the local access of the write thread that is approximately 2 minutes 2.8 seconds shows lower performance by approximately 11% than 1 minute 50.8 seconds which is a result value of the remote access. As a result, when the technology of the present disclosure is applied, it is anticipated that the result value of the local access which becomes a problem in the corresponding experiment may be reduced to approximately 1 minute 7.4 seconds which is a result when both the write thread and the journaling process are the local access, and it is anticipated that performance of up to 46% is enhanced.

When the experiment is performed in the existing file system with a varmail workload of Filebench, the local access of the write thread shows lower performance by approximately 4.42% than the remote access when the journaling process is in a remote node, and when the technology of the present disclosure is applied similarly to the previous experiment, throughput performance enhancement of up to approximately 39% is anticipated.

It will be apparent to those skilled in the art that various changes and modifications can be made without departing from the technical spirit of the present disclosure through contents described above. Therefore, the technical scope of the present disclosure should not be limited to the contents described in the detailed description of the present disclosure but should be defined by the claims.

What is claimed is:

1. A memory management system based on a non-uniform memory access, the system comprising:
- a first persistent memory disposed in a first node;
- a second persistent memory disposed in a second node physically distinguished from the first node;
- a first journaling process disposed in the first persistent memory; and
- a second journaling process disposed in the second persistent memory,
- wherein each of the first journaling process and the second journaling process determines a node on which performs journaling according to a position of metadata of a target file receiving a write request.

2. The system of claim 1, wherein the first persistent memory and the second persistent memory are virtually integrated.

3. The system of claim 2, wherein the first persistent memory and the second persistent memory share the same file system.

4. The system of claim 1, wherein when the metadata of the target file is present in the first node, the first journaling process performs the journaling.

5. A memory management method based on a non-uniform memory access, performed by a system which includes a first journaling process disposed in a first persistent memory of a first node, and a second journaling process disposed in a second persistent memory of a second node being physically distinguished from the first node, the method comprising:

- identifying a position of metadata of a target file in response to a write request of the target file; and
- selecting a journaling process which is to perform the journaling either the first journaling process or the second journaling process according to the position of the metadata.

* * * * *